United States Patent
Balzer et al.

(10) Patent No.: US 6,715,626 B2
(45) Date of Patent: Apr. 6, 2004

(54) FUEL CONTAINER

(75) Inventors: Martin Balzer, St. Augustin (DE); Karsten Friedrichs, Bad Honnef (DE); Werner Daubenbuechel, Overath (DE); Olaf Welland, Hamburg (DE); Peter Kluesener, Bonn (DE)

(73) Assignee: SIG Kautexc GmbH & Co., KG, Bonn (DE)

( * ) Notice: Subject to any disclaimer, the term of this patent is extended or adjusted under 35 U.S.C. 154(b) by 0 days.

(21) Appl. No.: 09/994,603

(22) Filed: Nov. 6, 2001

(65) Prior Publication Data

US 2002/0053566 A1 May 9, 2002

(30) Foreign Application Priority Data

Nov. 6, 2000 (DE) .......................................... 100 54 874

(51) Int. Cl.⁷ ............................... B65D 6/00; B65D 6/32
(52) U.S. Cl. ...................... 220/4.14; 220/4.13; 220/562; 220/678; 220/680
(58) Field of Search ................................. 220/562, 4.13, 220/4.14, 62.11, 62.22, 680, 678, 563, 564; 156/87, 308.4, 308.6, 228, 292; 264/531, 534, 515

(56) References Cited

U.S. PATENT DOCUMENTS

| 3,394,841 | A | * | 7/1968 | anderson | 220/645 |
| 4,215,782 | A | * | 8/1980 | Festag et al. | 206/525 |
| 4,349,124 | A | * | 9/1982 | Faller | 229/122.32 |
| 4,552,281 | A | * | 11/1985 | Schneider | 220/4.13 |
| 5,129,544 | A | * | 7/1992 | Jacobson et al. | 220/562 |
| 2002/0047015 | A1 | * | 4/2002 | Distelhoff et al. | 220/562 |

FOREIGN PATENT DOCUMENTS

| DE | 3717192 | * 12/1988 |
| DE | 19853097 | 5/2000 |
| JP | 62-8832 | * 1/1987 |
| WO | WO 00/48859 | 8/2000 |

* cited by examiner

Primary Examiner—Stephen K. Cronin
Assistant Examiner—Joseph C Merek
(74) Attorney, Agent, or Firm—Grossman, Tucker, Perreault & Pfleger, PLLC

(57) ABSTRACT

The invention concerns a fuel container of plastic material such as a motor vehicle fuel tank, having one or more welded seams as seam locations for the body of the container and/or as connecting or sealing seams between the container wall in the region of openings and closure elements or covers welded thereto. At least some of the welded seams are at least partially penetrated by a duct which extends in the longitudinal direction in the seam and which can be filled with air and vented.

11 Claims, 5 Drawing Sheets

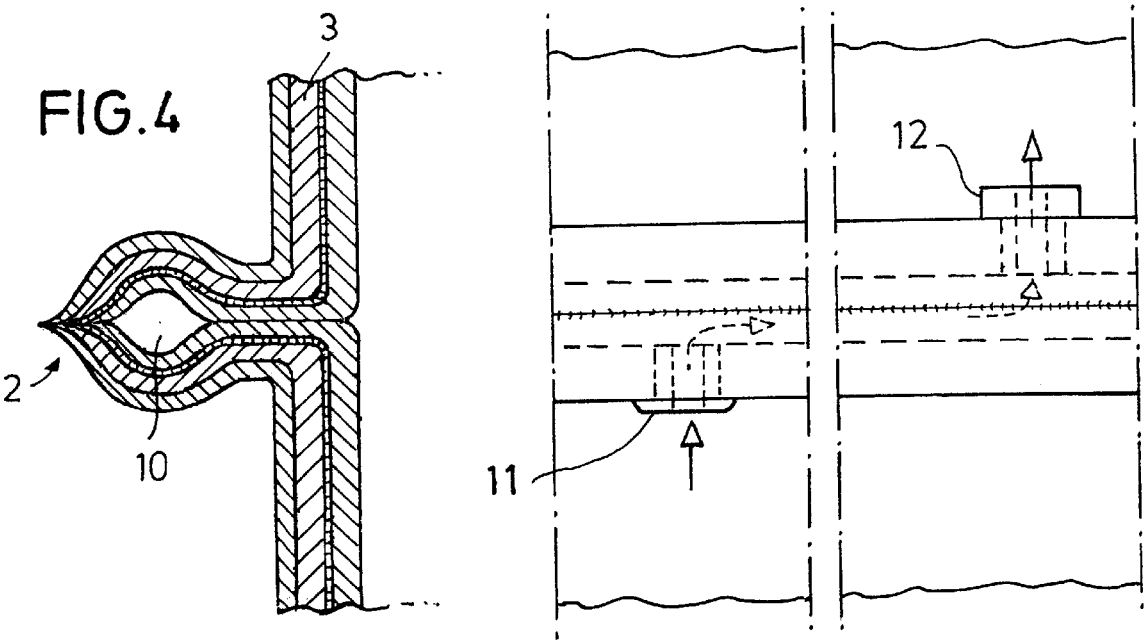
FIG.4
FIG.5
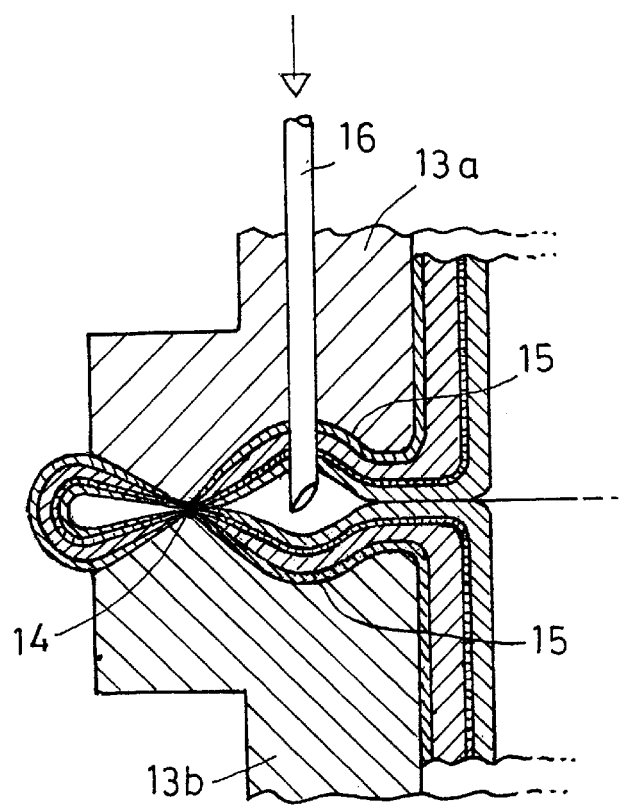
FIG.6

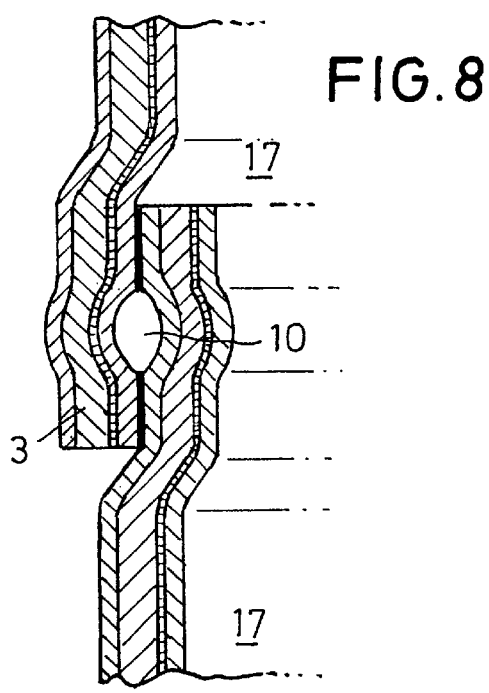
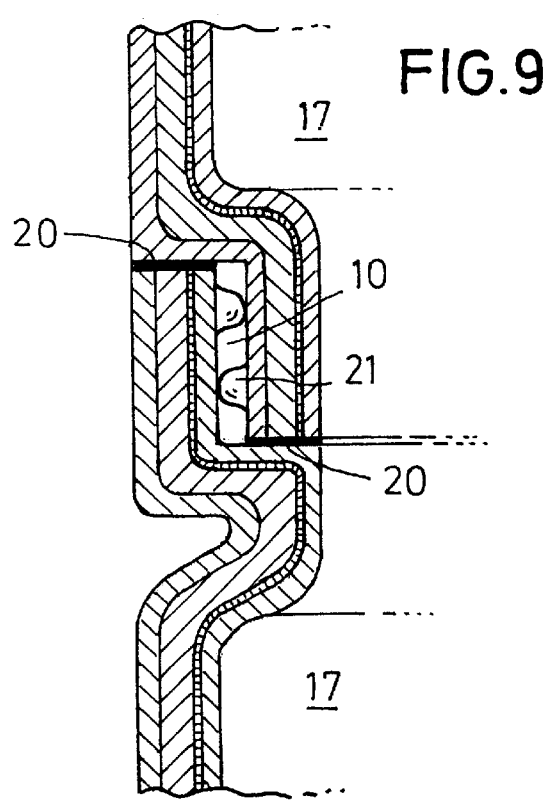
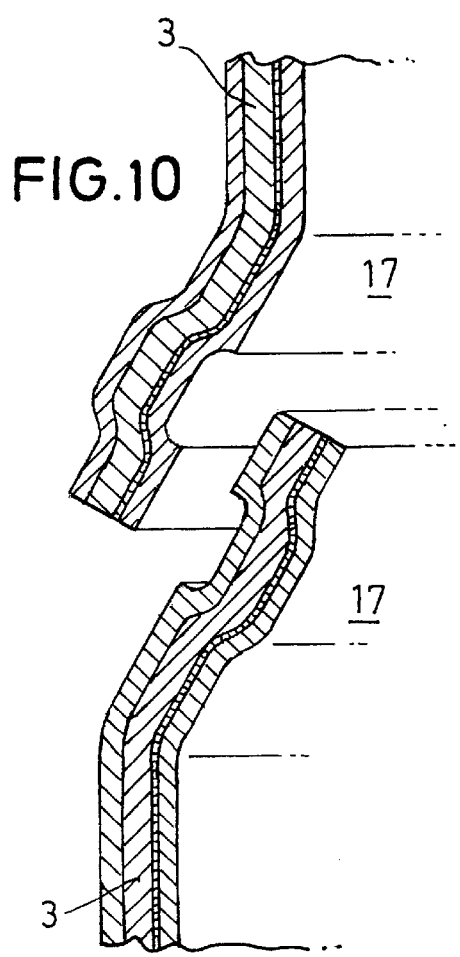
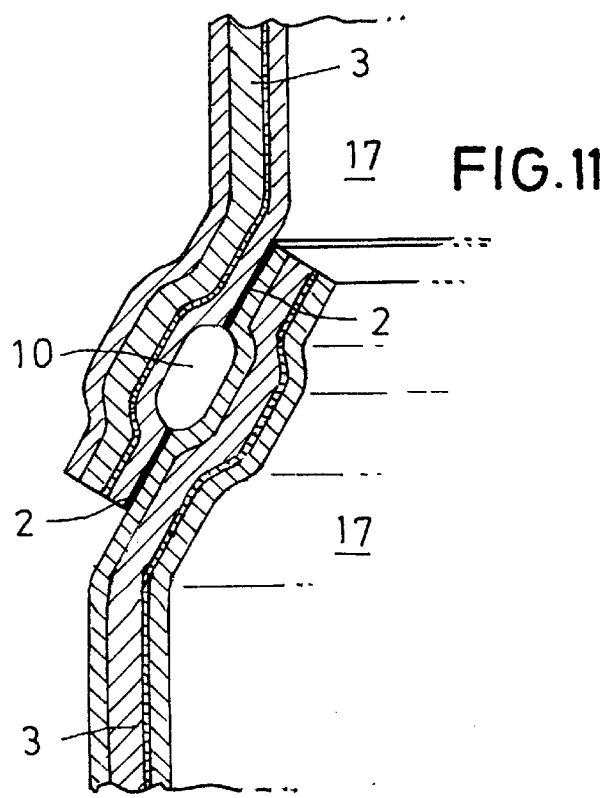

FUEL CONTAINER

FIELD OF THE INVENTION

The invention relates generally to a fuel container of plastic material and more particularly a fuel container in the form of a fuel tank of plastic material, for example for a motor vehicle.

BACKGROUND OF THE INVENTION

A typical form of a fuel container of plastic material comprises one or more welded seams acting as seam locations for affording structural integrity of the container body and/or in the form of connecting or sealing seams between a wall portion of the container body in the region of openings therethrough and closure elements or covers which are thereby secured to the container body. There is a wide range of different design configurations of fuel containers of that kind, for example as motor vehicle fuel tanks, which substantially comprise polyethylene. Such fuel containers of plastic material are to a greater or lesser degree permeable in relation to hydrocarbons, and, in the case of containers consisting of a single layer of polyethylene, hydrocarbons can fairly readily diffuse through the wall of the container.

A level of permeability which is markedly reduced in comparison with single-layer fuel containers or tanks of polyethylene is achieved in the case of fuel containers which are of a multi-layer wall structure, with diffusion-type barrier layers incorporated therein. Such containers are predominantly produced by an extrusion blow molding procedure. However even such containers may not be completely gas-tight. Problems arise in connection with such containers in relation to connecting elements such as valves and nipples which may necessarily be provided on the container, as well as the welded seams, through which hydrocarbons can still diffuse, as in the region of the welded seams the barrier layers are not directly welded to each other but in very thin residual layers are separated by material which has little barrier effect.

This problem is already addressed in WO 00/48859. To resolve that problem, it is proposed therein that a fuel tank is provided with a cover of a hood-like configuration, which forms, between itself and the outer wall surface of the tank, a cavity which is in the form of a fuel vapor collecting chamber and which encloses the seams of the tank as well as various connecting openings and cover members thereon. That hood-like cover is connected by welding to the outside wall surface of the tank. Such a structure is extremely complicated and expensive and in addition such a design configuration still allows hydrocarbons to be discharged to the ambient atmosphere through the welded seams of the hood-like cover.

Consideration may also be given to DE 198 53 097 A1 disclosing for example a fuel container or tank which is composed of two halves and which has a wall produced from plastic material by an injection molding procedure. Each half of the tank in turn comprises shell portions which are arranged in mutually superposed relationship and between which a slit or gap is left free. Fuel vapors which have passed into that gap are removed therefrom and filtered. Such a design configuration still involves the problem that the welded seams of the tank represent potential weak points.

SUMMARY OF THE INVENTION

An object of the present invention is to improve a fuel container of plastic material, such that it discharges as little fuel vapor to the ambient atmosphere as possible.

Another object of the present invention is to provide a fuel container of plastic material which, while affording appropriate structural integrity, can satisfy demands made thereon in terms of emission of fuel vapors to the atmosphere, without entailing a complex design configuration.

Still another object of the invention is to provide a fuel container of plastic material, so designed as to avoid serious fuel vapor emissions to the ambient atmosphere without involving major structural steps for completely sealing off welded seams of the fuel container.

In accordance with the principles of the present invention the foregoing and other objects are attained by a fuel container of plastic material, for example a motor vehicle tank, comprising one or more welded seams as seam locations of the container body and/or as connecting or welding seams between a wall of the container body in the region of at least one opening and a closure element or cover welded thereto. At least one of the welded seams is at least partially penetrated by a duct which extends in the longitudinal direction thereof. The duct can be filled with air and vented of air for ventilation purposes.

As will be seen in greater detail from preferred embodiments of the invention as described hereinafter instead of requiring total and complete sealing of the welded seams of the container, which can be achieved only at the cost of extremely high structural complication and expenditure, in general terms, the invention aims to provide for ventilation of the welded seams by means of the duct passing therethrough, which can be implemented using simple means.

In a preferred feature of the invention the duct can have connections for filling and venting, at each end.

In a further preferred feature the connections can be provided with valves, for example for air-filling or venting purposes.

In the case of a fuel container which was produced by extrusion blow molding from a multi-layer preform, a preferred feature can provide that the duct was produced by recesses or openings in the edges of the blow molding mold.

When the fuel container is made from two half-shell portions which are welded together, with the half-shell portions being respectively welded together at connecting flanges thereon, the connecting flanges can each have groove-shaped openings forming at least one duct.

As an alternative thereto the fuel container can be formed from two half-shell portions which are welded together at their ends, with at least one duct being kept free between two peripherally extending steps or shoulders of the half-shell portions.

In a further preferred feature of the invention the seam location of the container body, which includes a respective duct, can be penetrated in a portion-wise manner by the duct, wherein a plurality of duct portions can communicate with a common venting conduit. Venting of at least one duct can be effected by way of a filter element, preferably by way of an activated carbon filter which is in any case associated with the fuel container.

Finally, means can be provided for pressure filling at least one duct with air. The flushing air which is introduced into the duct in that way can be passed to the internal combustion engine which is fed with fuel from the fuel container, or to an activated carbon filter which is in any case present in a motor vehicle. Ventilation of the passages can be effected both by means of a reduced pressure and also by means of an increased pressure.

It will be assumed however that the introduction of air will automatically occur by virtue of the drop in concentration of the hydrocarbon vapors, in a duct according to the invention, when that duct for example is connected to a filter element.

Further objects, features and advantages of the invention will be apparent from the description hereinafter of preferred embodiments thereof.

BRIEF DESCRIPTION OF THE DRAWING

FIG. 4 is a view in section through part of a fuel container in accordance with a first embodiment of the invention in the region of a welded seam, FIG. 5 is a simplified view on to the welded seam shown in FIG. 4, FIG. 6 is a partial section through a blow molding mold showing production of a fuel container in accordance with the first embodiment of the invention, FIGS. 8 through 11 show various configurations of a connection between two half-shell portions to constitute a fuel container.

DESCRIPTION OF THE PREFERRED EMBODIMENTS

Figure 1:
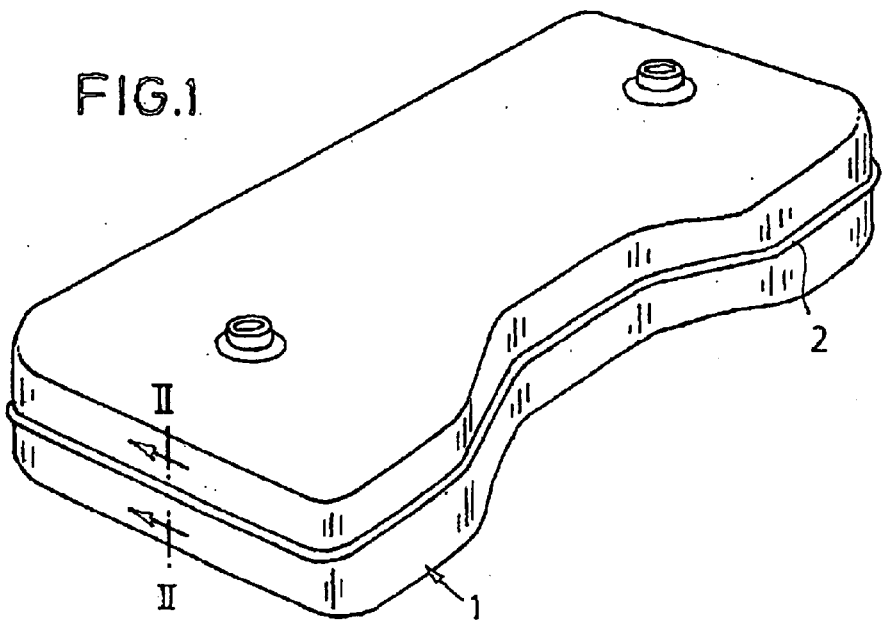
FIG. 1 is a perspective view of a fuel container of plastic material, in the form of a motor vehicle tank.

Referring firstly to FIG. 1, shown therein is a greatly simplified perspective view of a fuel container 1 of plastic material, which has a peripherally extending welded seam generally indicated at 2. The fuel container 1 shown can typically be the fuel tank of a motor vehicle.

Figure 2:
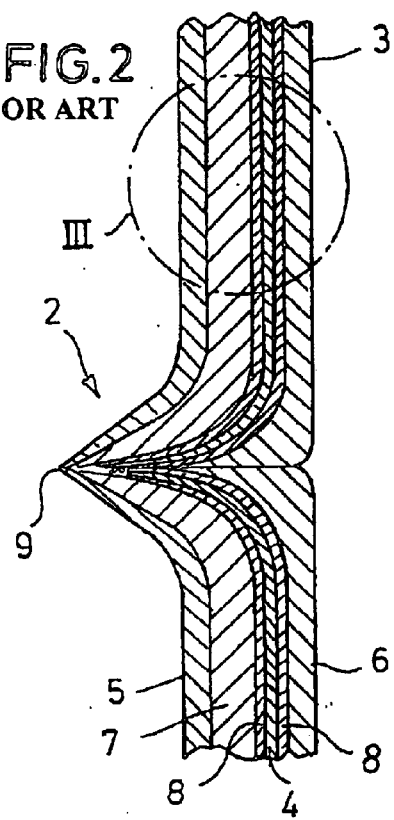
FIG. 2 is a view on an enlarged scale in section of a welded seam on a blow-molded fuel container of plastic material, which is structured in known manner and thus represents state of the art.

The illustrated fuel container 1 is preferably in the form of a hollow molding produced by extrusion blow molding, with a multi-layer container wall as indicated at 3 in FIG. 2 which in known manner involves a six-layer structure including an inwardly disposed barrier layer 4 to afford permeability resistance for hydrocarbons.

It should be mentioned at this juncture that the invention expressly also concerns fuel containers which were welded together from two half-shell portions in the second heat. Whether the plastic components to be welded together are of a single-layer or multi-layer structure is of significance in regard to the invention only insofar as the problem of the welded seams as potential diffusion weak points in the fuel container is important, in particular in the case of fuel containers with walls of a multi-layer structure.

These problems will be discussed hereinafter with reference to FIGS. 2 and 3, with FIG. 2 showing part of a container wall 3 with a welded seam 2 formed by the procedure in the state of the art.

Figure 3:
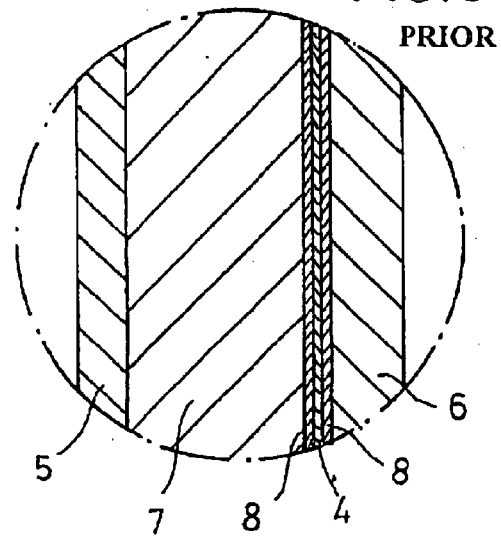
FIG. 3 shows a portion on an enlarged scale of the wall of a fuel container as shown in FIG. 2.

FIG. 3 shows a portion on an enlarged scale from the container wall 3 in FIG. 2, showing the typical structure of a multi-layer container wall 3 of a plastic container produced by extrusion blow molding. The wall comprises an outer layer 5 and an inner layer 6, each comprising polyethylene. The outer layer is possibly of a dark color. The outer layer 5 is of a layer thickness of between about 10 and 15% of the overall thickness of the container wall and the inner layer is of a thickness of about 20%, as the load-bearing layer. Reference 7 denotes a layer of regenerated or recycled material, for example processed waste material or scrap, generally comprising a mixture of all materials forming the container wall 3. The barrier layer 4 is embedded between the layer 7 and the inner layer 6, with the interposition of bonding layers.

It will be appreciated that, upon production of a fuel container 1 of such a configuration by extrusion blow molding the operation of squeezing off the tubular preform will give rise to a welded seam 2 of greater or lesser size and which under some circumstances may extend completely around the fuel container, as is shown in FIG. 2. As can readily be seen from FIG. 2 it will be appreciated that the inner layers 6 of the container wall 3 in that case bear against each other. In the region of the location where the tubular preform is squeezed off, all the layers blend together, but over wide parts of the welded connection formed in that way only the inner layers 6 of adjacent wall regions are in contact against each other, even if in that region they are of a reduced residual thickness. Those residual-thickness layers have a lower level of barrier effect in relation to hydrocarbons so that consequently a small proportion of hydrocarbons can still diffuse through the welded seam 2.

Reference is now made to FIG. 4 showing an embodiment of a welded seam of a fuel container 1 in accordance with the present invention. The welded seam 2 is of such a configuration that it is penetrated in its longitudinal extent by a duct 10 which is adapted to be filled with and emptied of air. Hydrocarbons which diffuse from the interior of the fuel container 1 through the inner layers 6 which are welded together and between the barrier layers 4 pass into the duct 10 by virtue of the lower partial pressure therein.

It will be noted that the wall structure of the fuel container is shown in simplified views in the relevant Figures illustrating the various embodiments of the invention, and that wall structure should approximately correspond to that illustrated in FIG. 3.

Looking now at FIG. 5, the view therein diagrammatically shows that the duct 10 is provided at each of two end positions with an air-filling or intake connection 11 and an air-discharge or venting connection 12. By virtue of a drop in concentration in the duct 10 to a filter element (not shown), fuel vapors will be positively caused to flow through the duct 10 and issue therefrom into the filter element. It will be noted that the duct 10 can also be specifically and targetedly flushed with air or ventilated, for example either by applying a reduced pressure to the duct at an appropriate location or by applying an increased pressure thereto. The flushing air does not necessarily have to be fed to a filter element but rather it can also be fed to the combustion air for the associated engine.

The connections 11 and 12 which are provided for ventilation purposes on the duct 10 can also be formed in the procedure for producing the fuel container 1.

Reference is now made to FIG. 6 diagrammatically showing manufacture of a fuel container 1 in accordance with the present invention by extrusion blow molding. In FIG. 6, references 13a and 13b show first and second mold portions of a blow molding mold in a closed condition, while reference 14 denotes cutting edges which sever the material, projecting out of the mold, of the preform which is already expanded under the effect of an increased pressure therein, thereby to form the welded seam 2. As can be seen from FIG. 6 the squeeze edges of the mold portions 13a, 13b are each provided with a respective semicircular groove 15 which extends around the mold. The grooves 15 form a duct-shaped opening or recess when the mold portions 13a, 13b are in the closed condition as shown. In order to ensure that the duct 10 remains free and open and the walls of the container are not welded together in that region, a plurality of blowing needles 16 which are arranged at spacings in succession may possibly be provided in the longitudinal direction of the welded seam 2, for example at least at the beginning and at the end of the duct 10. The blowing needles 16 extend into the opening or recess defined by the grooves 15 and serve to introduce blowing air thereinto in order to cause the duct 10 to be inflated into the appropriate shape against the wall surfaces of the grooves 15.

Figure 7:
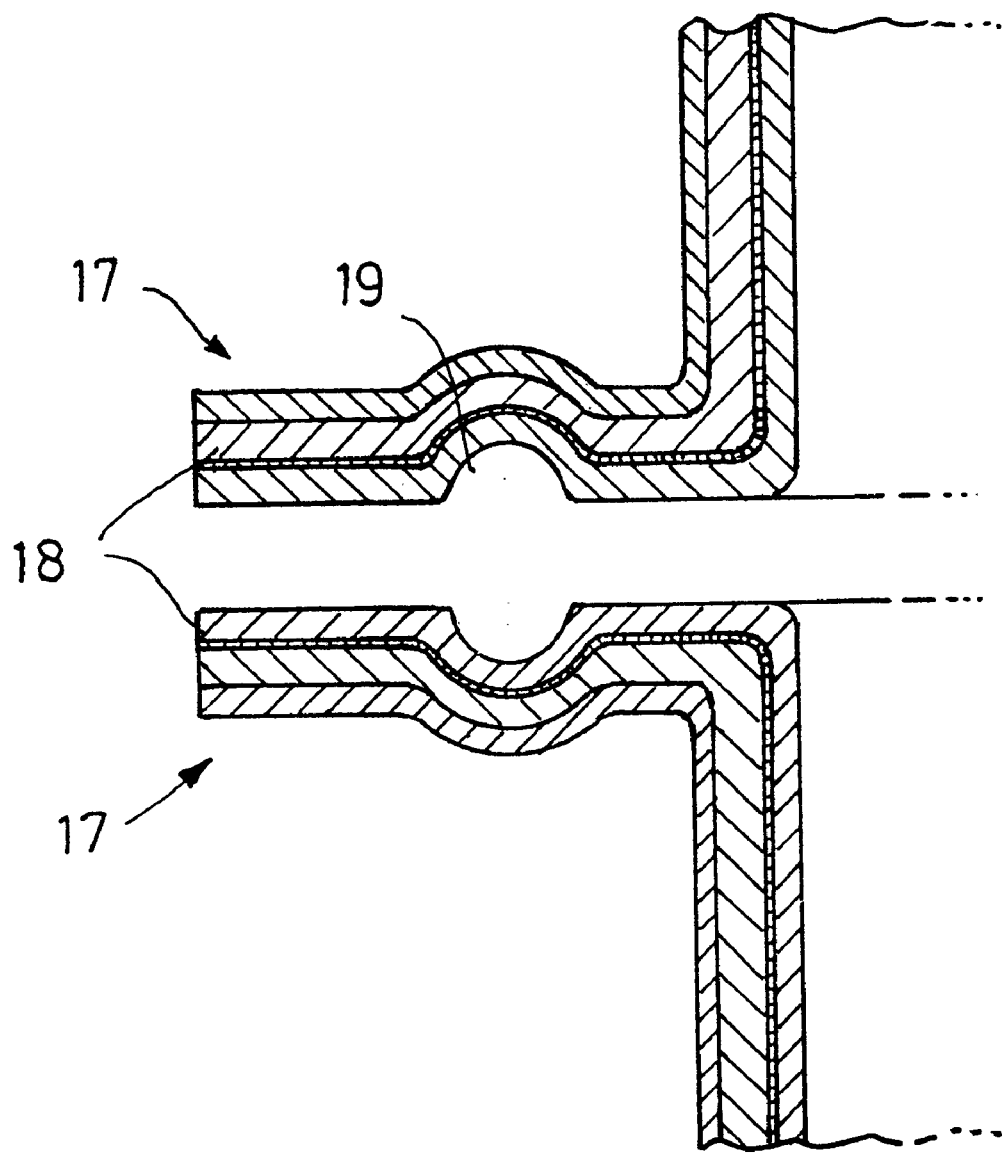
FIG. 7 is a view in section on an enlarged scale through the wall of a fuel container in accordance with a second embodiment of the invention in the region of a welded seam, this fuel container being composed of two half-shell portions.

Looking now at FIG. 7, diagrammatically shown therein is a connection on a fuel container 1 comprising two prefabricated half-shell portions 17 each of a multi-layer wall structure. The regions which are to be welded together are each in the form of peripherally extending flange-like collars 18. A duct 10 of the kind described hereinbefore is also formed by channels 19 which are provided in the respective collars 18, after the two half-shell portions 17 are welded together.

FIGS. 8 through 11 show various alternative configurations of container walls 3 when first and second half-shell portions 17 are welded together to form a fuel container 1. In the alternative configuration of the wall container 3 in the region of the welded seam 2, as shown in FIG. 8, the inside wall of the first half-shell portion 17, being the upper half-shell portion in FIG. 8, is welded to the outside wall of the second half-shell portion 17, thereby forming the duct 10 therebetween. In this configuration of the connection between the half-shell portions 17, pressure can be applied to the welded seam 2 at the inside of the container when making the connection, such pressure being produced for example by means of a gaseous medium.

In the case of the connection shown in FIG. 9 the container walls 3 are welded together in the manner of an end butting relationship, forming respective steps or shoulders as indicated at 20. For the purposes of centering the half-shell portions 17 with respect to each other and in order to keep the duct 10 open, spacers in the form of respective knobs 21 are provided at the inside and outside on the wall regions of the half-shell portions 17, which form the duct 10. The knobs 21 are arranged in respective rows which extend in the longitudinal direction of the welded seam 2, and thus into the plane of the drawing.

In the case of the connection between the half-shell portions 17 as shown in FIGS. 10 and 11, one half-shell portion 17 is of a configuration such as to conically enlarge in a direction towards its opening, in other words, the upper half-shell portion 17 in FIG. 10 expands conically outwardly in a downward direction, whereas the other half-shell portion, being the lower half-shell portion 17 in FIG. 10, is of a conically inwardly tapering configuration in complementary relationship therewith, thereby affording an angular position for the welded seam or seams 2, which is such that it can compensate for inaccuracies in respect of shape and in which a pressure is applied to the welded seam 2 when the half-shell portions 17 are fitted together.

It will be appreciated that while the foregoing text at the appropriate locations refers in each case only to a welded seam, that is also intended to denote first and second welded seams which are at a spacing from each other, being separated by the duct 10.

Figure 12:
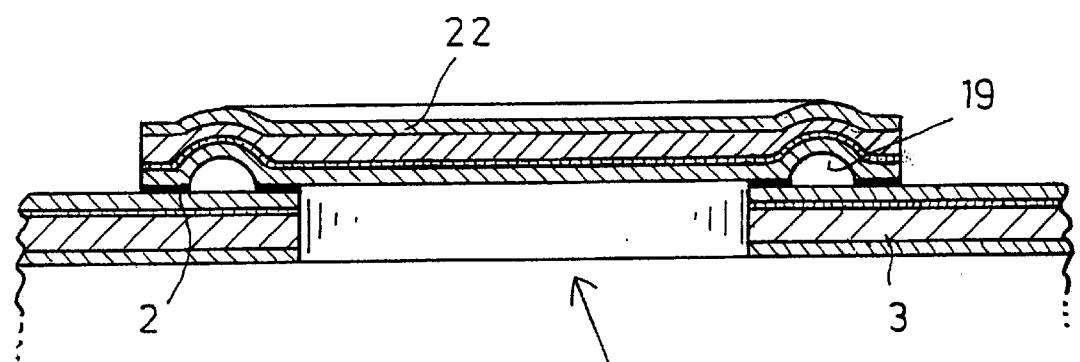
FIGS. 12 and 13 are views in section on an enlarged scale of a part of the wall of a fuel container.
Figure 13:
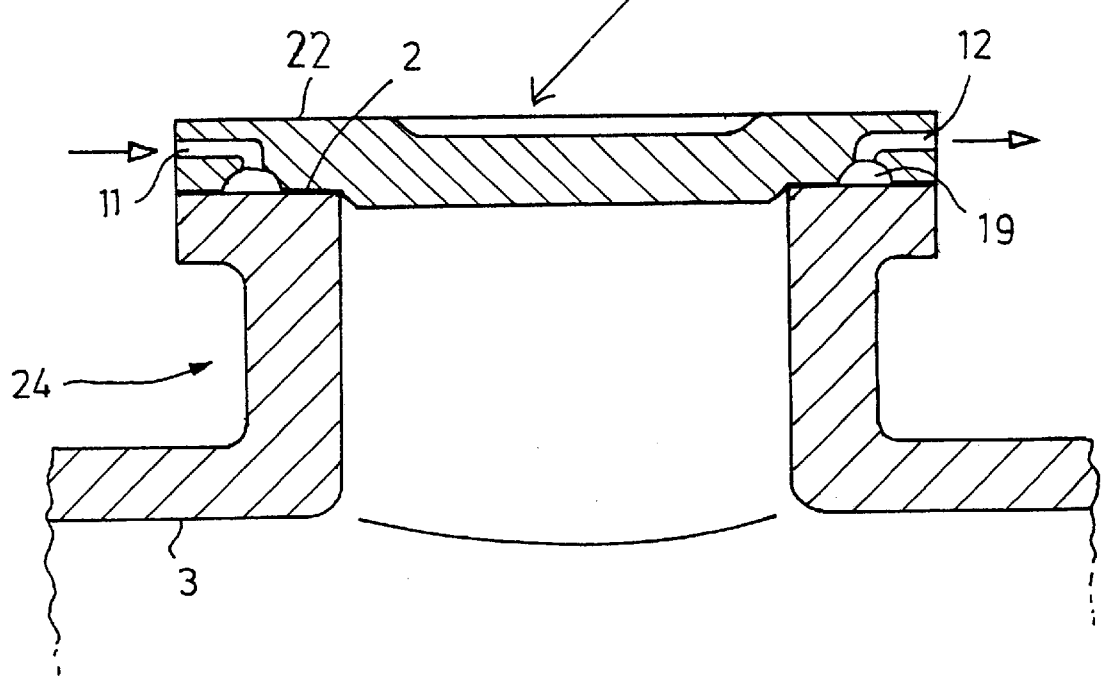

Finally, referring to FIGS. 12 and 13, shown therein is the welding of a multi-layer cover 22 with at least one barrier layer 4 embedded therein, to the container wall 3, in the region of an opening 23 therein. Provided in the cover 22 on the inward face thereof, that is to say on the face thereof which is towards the container wall 3, extending peripherally therearound at the edge portion thereof, is a channel 19 which is of semicircular cross-section and which forms a duct which is also semicircular in cross-section. A corresponding channel is not provided in the container wall 3 as that is not absolutely necessary and would only represent unnecessary weakening of the container wall 3 in that region. It will be appreciated that in a corresponding manner the duct may also be of the configuration shown in the embodiments of FIGS. 7 through 11. FIG. 13 shows an alternative form of this structure where a cover 22 is welded to the fuel container in the region of an opening 23, at a location where the container wall 3 forms a cover flange or neck structure 24. FIG. 13 also shows an air intake connection 11 communicating with the duct 10 and an air-discharge or venting connection 12. It will be appreciated that the connections 11 and 12 may also be provided in the embodiment illustrated in FIG. 12 but are not shown therein.

It will be appreciated that the above-described embodiments of the invention have been set forth solely by way of example and illustration of the principles of the present invention and that various other modifications and alterations may be made therein without thereby departing from the spirit and scope of the invention. For example the shell portions 17 may be obtained by cutting open a blow-molded container or tank.

What is claimed is:

1. A fuel container of plastic material comprising;
    a container body having two sections, each section having a peripheral flange, said flanges being joined by first and second welded seams, wherein said first and second welded seams are separated by a duct, said duct extending in the longitudinal direction of said flanges, and
    means for filling the duct with air and venting same of air.

2. A fuel container as set forth in claim 1 wherein the container body has wall portions and the welded seams connect the wall portions of the container body has wall portion and the container body.

3. A container as set forth in claim 1 wherein said means of filling the duct includes respective connections.

4. A container as set forth in claim 3 wherein the connections are provided with valves.

5. A container as set forth in claim 1 which is of a multi-layer structure having at least one barrier layer for hydrocarbons, which is completely embedded in the container body wall.

6. A container as set forth in claim 1 wherein said two sections are produced from first and second shell portions.

7. A container as set forth in claim 6 wherein the shell portions were obtained by cutting open a blow-molded container.

8. A container as set forth in claim 1 and further including a filter element operatively associated with said duct for filtered venting thereof.

9. A container as set forth in claim 8 wherein said filter element is an activated carbon filter.

10. A container as set forth in claim 1 and further including means for pressure filling said duct with air.

11. A container as set forth in claim 1 which was produced by extrusion blow molding of a multi-layer preform, having a wall in which at least one barrier layer for hydrocarbons is embedded.

* * * * *

UNITED STATES PATENT AND TRADEMARK OFFICE
CERTIFICATE OF CORRECTION

PATENT NO.    : 6,715,626 B2
DATED         : April 6, 2004
INVENTOR(S)   : Balzer et al.

It is certified that error appears in the above-identified patent and that said Letters Patent is hereby corrected as shown below:

Title page,
Item [73], Assignee, please change name to -- SIG Kautex GmbH & Co., KG --.

Column 6,
Line 43, after "body", delete "has wall portion and the container body".

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO.    : 6,715,626 B2
DATED         : April 6, 2004
INVENTOR(S)   : Balzer et al.

It is certified that error appears in the above-identified patent and that said Letters Patent is hereby corrected as shown below:

<u>Title page,</u>
Item [75], Inventor, please change "Olaf Welland" to -- Olaf Weiland --.

Signed and Sealed this

Twenty-eighth Day of June, 2005

JON W. DUDAS
*Director of the United States Patent and Trademark Office*